(12) United States Patent
Matsui et al.

(10) Patent No.: US 6,734,892 B2
(45) Date of Patent: May 11, 2004

(54) OPTICAL DEFLECTION DEVICE AND IMAGE FORMING APPARATUS EQUIPPED THEREWITH

(75) Inventors: Susumu Matsui, Tokyo (JP); Hiroshi Kobayashi, Tokyo (JP); Takaaki Kurosawa, Tokyo (JP)

(73) Assignee: Konica Corporation, Tokyo (JP)

( * ) Notice: Subject to any disclaimer, the term of this patent is extended or adjusted under 35 U.S.C. 154(b) by 46 days.

(21) Appl. No.: 10/081,328

(22) Filed: Feb. 20, 2002

(65) Prior Publication Data

US 2002/0130949 A1 Sep. 19, 2002

(30) Foreign Application Priority Data

Mar. 19, 2001 (JP) ........................................ 2001-078492

(51) Int. Cl.[7] ................................................. B41J 27/00
(52) U.S. Cl. ........................................ 347/261; 347/243
(58) Field of Search ................................. 347/241, 243, 347/256, 259, 260, 261; 359/198, 200; 310/90.5, 90

(56) References Cited

U.S. PATENT DOCUMENTS 5,754,326 A * 5/1998 Kunii ........................... 359/198
5,874,793 A * 2/1999 Kuwayama et al. ......... 310/90.5

FOREIGN PATENT DOCUMENTS

JP            8-93750       *  4/1996    ............ F16C/17/02

* cited by examiner

*Primary Examiner*—Hai Pham
(74) *Attorney, Agent, or Firm*—Squire, Sanders & Dempsey

(57) ABSTRACT

An optical deflection device having a rotary body that is fixed on a bearing and is structured rotatably by a magnet arranged to face a coil provided on a base side, wherein the rotary body is made of a magnet and a polygon mirror is fixed on the rotary body.

5 Claims, 6 Drawing Sheets

OPTICAL DEFLECTION DEVICE AND IMAGE FORMING APPARATUS EQUIPPED THEREWITH

BACKGROUND OF THE INVENTION

The present invention relates to an optical deflection device that deflects light by means of a rotation of a polygon mirror and to an image forming apparatus equipped with the optical deflection device, and in particular, to an optical deflection device and an image forming apparatus in both of which the number of parts are reduced to make a substantial cost reduction possible.

In a conventional optical deflection device used as an optical scanning means in a writing unit of an image forming apparatus such as a laser printer, a laser copying machine, a laser facsimile machine and a combined machine including the foregoing, a polygon mirror is rotated at high speed, and a beam emitted from a light source composed of a semiconductor laser is deflected by the rotating polygon mirror so that an image recording medium such as a photoreceptor drum is scanned by the beam.

An example of the conventional optical deflection device stated above is shown in FIG. 8. In this conventional optical deflection device, polygon mirror 200 is interposed between flange section 101 of body of rotation 100 and rotary yoke 102 to be incorporated solidly, and the body of rotation 100 in which the polygon mirror is incorporated is mounted rotatably on shaft portion 301 that is protruded on base 300 through bearing 400, while, magnet 103 is arranged on the rotary yoke 102 to face coil 303 attached on base board 302 that is provided on the base 300, thus, an electric current is made to flow through the coil 303 on the base 300 to rotate the body of rotation 100 through magnet 103 and thereby to rotate the polygon mirror 200 incorporated solidly in the body of rotation 100.

In the conventional optical deflection device as in the foregoing, there are many parts used because the body of rotation 100 is fixed on the bearing 400 mounted on the shaft portion 301 of the base 300, the polygon mirror 200 is incorporated in the flange section 101 of the body of rotation 100, and the magnet 103 is arranged on the rotary yoke 102 that is provided to interpose the polygon mirror 200 between itself and the flange section 101. Therefore, man-hour requirement for incorporating the polygon mirror 200 is great, resulting in a rise of manufacturing cost and a problem that an optical deflection device is made to be large.

SUMMARY OF THE INVENTION

With the background mentioned above, an object of the invention is to provide an optical deflection device wherein the number of parts needed to incorporate a polygon mirror is reduced sharply to achieve low cost and a small size of the optical deflection device and an image forming apparatus employing the optical deflection device.

Structure (1) to solve the problem stated above is represented by an optical deflection device having therein a body of rotation that is fixed on a bearing and is structured rotatably by a magnet arranged to face a coil provided on the base side, wherein the body of rotation is made of a magnet and a polygon mirror is fixed on the body of rotation.

Structure (2) is represented by the optical deflection device described in the Structure (1), wherein the body of rotation is made of a molded plastic magnet, and is fixed on the bearing through injection molding.

Structure (3) is represented by the optical deflection device described in the Structure (1), wherein the body of rotation is fixed on the bearing by means of either one of force fitting, shrinkage fitting and adhesion.

Structure (4) is represented by the optical deflection device described in the Structure (3), wherein the body of rotation is provided, on its portion that is in contact with the bearing, with a cut-out or irregularity.

Structure (5) is represented by the optical deflection device described in either one of the Structures (1), (2), (3) or (4), wherein the bearing is a dynamic pressure bearing.

Structure (6) is represented by the optical deflection device described in the Structures (5), wherein the dynamic pressure bearing is made of ceramic.

Structure (7) is represented by an image forming apparatus wherein light emitted from a light source is deflected by the optical deflection device described in either one of the Structures (1)–(6) to scan an image recording medium for recording images and thereby for forming images.

BRIEF DESCRIPTION OF THE DRAWINGS

FIGS. 5(A) and 5(B) are perspective vies, wherein FIG. 5(A) represents a perspective view showing an example of providing cut-outs on a body of rotation, and 5(B) represents a perspective view showing an example of providing irregularity on a body of rotation.

DETAILED DESCRIPTION OF THE PREFERRED EMBODIMENT

An embodiment of the optical deflection device of the invention will be explained in detail as follows, referring to drawings.

Figure 1:
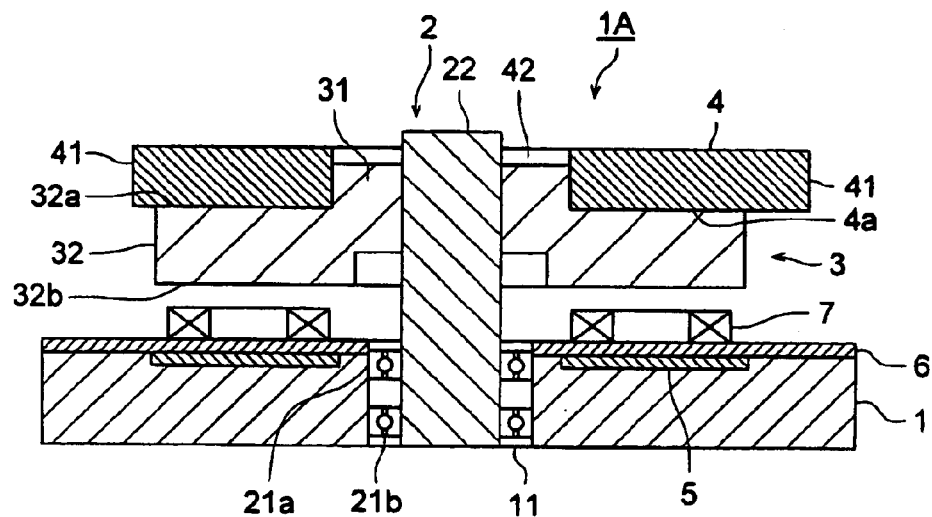
FIG. 1 is a longitudinal cross section showing the first embodiment of an optical deflection device related to the invention.

FIG. 1 is a longitudinal cross section showing the first embodiment of an optical deflection device related to the invention. In the optical deflection device 1A, there is provided bearing 2 in opening 11 that is bored through base 1. The bearing 2 is composed of ball bearings 21a and 21b and of rotary bearing 22, and the circular cylindrical rotary bearing 22 is provided rotatably through the ball bearings 21a and 21b arranged in the opening 11.

Body of rotation 3 has therein cylindrical section 31 fitted with the rotary bearing 22 and flange section 32 that is extended from the cylindrical section 31 in the radial direction, and the cylindrical section 31 and the flange section 32 are made to form a step between them by reference plane 32a of the body of rotation 3 formed through machining of the a top surface of the flange section 32.

In the invention, the body of rotation 3 it self is made of a magnet. In particular, a plastic magnet is preferably used as a magnet. The plastic magnet makes injection molding possible, and makes the body of rotation 3 having cylindrical section 31, flange section 32 and a magnet to be formed solidly. Therefore, it is not necessary to prepare magnets as separate parts, an incorporating step for fixing a magnet prepared separately on the flange section is made to be unnecessary, and manufacturing steps can be simplified.

Polygon mirror 4 is formed to be in a flat polygonal shape whose side face is mirror surface 41 (not shown). The polygon mirror 4 has, on its central portion, opening 42 to be fitted with cylindrical section 31 of the body of rotation 3, and the opening 42 is fitted externally with the cylindrical section 31 of the body of rotation 3, and end face 4a of the polygon mirror 4 is brought into contact with reference plane 32a of the flange section 32, thus, the polygon mirror 4 is fixed directly on the body of rotation 3 by the use of adhesive agents.

The body of rotation 3 composed of the polygon mirror 4 that is fixed on the body of rotation 3 as stated above is fixed, with its cylindrical section 31 fitted externally with the rotary bearing 22 that is provided on the base 1. As a method to fix the body of rotation 3 on the rotary bearing 22, it is preferable to make the body of rotation 3 to be solid with the rotary bearing 22 when forming the body of rotation 3 through injection molding by the use of a plastic magnet. This method eliminates the step to incorporate the rotary bearing 22 in the body of rotation 3, which simplifies manufacturing steps. When uniting the body of rotation 3 and the rotary bearing 22 in a body through injection molding, it is preferable to prevent coming off/slippage of them by uniting both of them firmly, by roughening the surface of the rotary bearing 22 that is in contact with the body of rotation 3 through machining or blasting.

On the base 1, there is provided fixed yoke 5 so that it surrounds opening 11, and on the top surface of the fixed yoke 5, there is provided base board 6. On the base board 6, there are attached appropriate number of coils 7 so that they face bottom surface 32b of the flange section 32 of the body of rotation 3, and when an electric current is made to flow to the coils 7 through the base board 6, the body of rotation 3 formed with a magnet is rotated at prescribed speed around a shaft of rotary bearing 22, and thereby, polygon mirror 4 fixed on the body of rotation 3 is rotated.

In optical deflection device 1A of the first embodiment, the number of parts with which polygon mirror 4 is incorporated rotatably is reduced sharply, compared with a conventional case, because body of rotation 3 itself is formed with a magnet and polygon mirror 4 is directly fixed on the rotation body 3 composed of the magnet. Due to this, man-hour requirement for incorporating is reduced, and it makes it possible to manufacture the optical deflection device 1A at low cost. Further, the reduction of the number of parts makes a rotating section composed of polygon mirror 4 and body of rotation 3 to be small in size and to be light in weight, thus, time required for the polygon mirror 4 to arrive at constant speed rotation from the state of interruption can be shortened, which is an effect.

Figure 2:
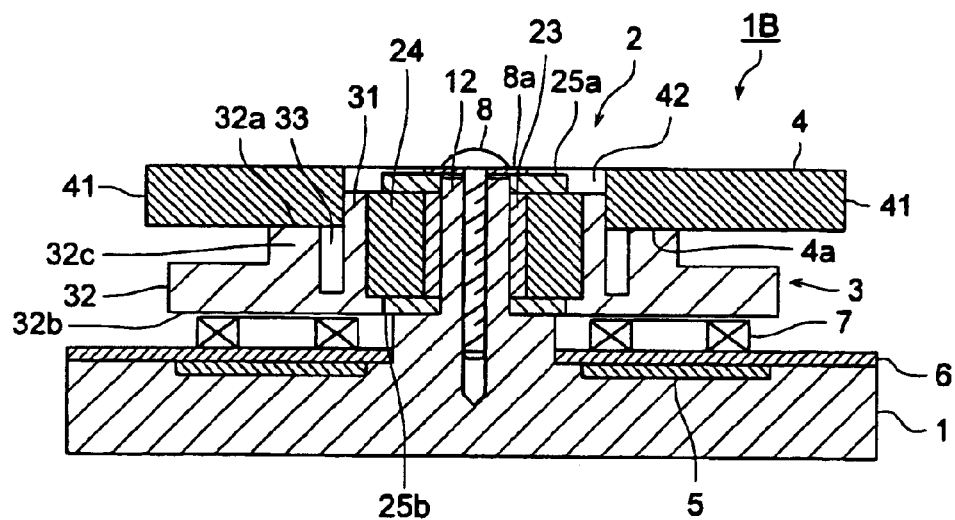
FIG. 2 is a longitudinal cross section showing the second embodiment of an optical deflection device related to the invention.

The optical deflection device of the invention is not limited to the embodiment stated above, and it may take various embodiments shown below. FIG. 2 is a longitudinal cross section showing the second embodiment of an optical deflection device related to the invention. Symbols which are the same as those in FIG. 1 have the same structure, unless otherwise explained.

In the optical deflection device 1B, shaft portion 12 on which the body of rotation 3 is mounted rotatably to be supported thereon is provided on base 1 to be protruded therefrom, and bearing 2 is mounted on the shaft portion 12.

In the present embodiment, bearing 2 has cylindrical and radial bearing 23 fitted with bearing on base 1 and cylindrical rotary bearing 24 that engages rotatably with the radial bearing 23, and it is fixed on the bearing 12 through plate 8a by screw 8, in a way to be interposed between upper thrust and fixed bearing 25a and lower thrust and fixed bearing 25b, under the condition that the radial bearing 23 and the rotary bearing 24 are fitted with the bearing 12 on the base 1.

In this bearing 2, dynamic pressure generating grooves (not shown) are formed both on an upper surface of the lower thrust and fixed bearing 25b and on the outer circumferential surface of the radial bearing 23, which forms an air dynamic pressure bearing which makes the rotary bearing 24 to rotate smoothly along an outer circumferential surface of the radial bearing 23 in the spade between the upper and lower thrust and fixed bearings 25a and 25b. By using an air dynamic pressure bearing as bearing 2 as in the foregoing, it is possible to rotate the body of rotation 3 at higher speed.

In particular, when the radial bearing 23 constituting the air dynamic pressure bearing, the rotary bearing 24 and upper and lower thrust and fixed bearings 25a and 25b are made of ceramic, their abrasion resistance increases to make them to rotate at high speed with a long life, which is preferable.

In the present embodiment, the body of rotation 3 is fixed on the rotary bearing 24. The body of rotation 3 in the present embodiment has therein cylindrical section 31 that is fitted externally with the rotary bearing 24 and flange section 32 extending from the cylindrical section 31 in the radial direction, and groove 33 is provided around the cylindrical section 31 to be concentric with that cylindrical section 31. Due to this, a strain of the cylindrical section 31 caused by fitting between the rotary bearing 24 and the cylindrical section 31 of the body of rotation 3 is prevented from having an influence on the flange section 32.

The flange section 32 has protruded portion 32c on the outer side of the groove 33 to be concentric with the cylindrical section 31, on the upper surface of the flange section 32, and reference plane 32a of the body of rotation 3 is formed on the upper surface of the protruded portion 32c through the work of machining.

The polygon mirror 4 is glued directly on the body of rotation 3, with its central opening 42 being fitted externally with the cylindrical section 31 of the body of rotation 3, and with its one end face 4a being brought into contact with the reference plane 32a on the upper surface of the protruded portion 32c of the flange section 32.

The optical deflection device 1B related to the second embodiment also produces the effect which is the same as that described above.

Figure 3:
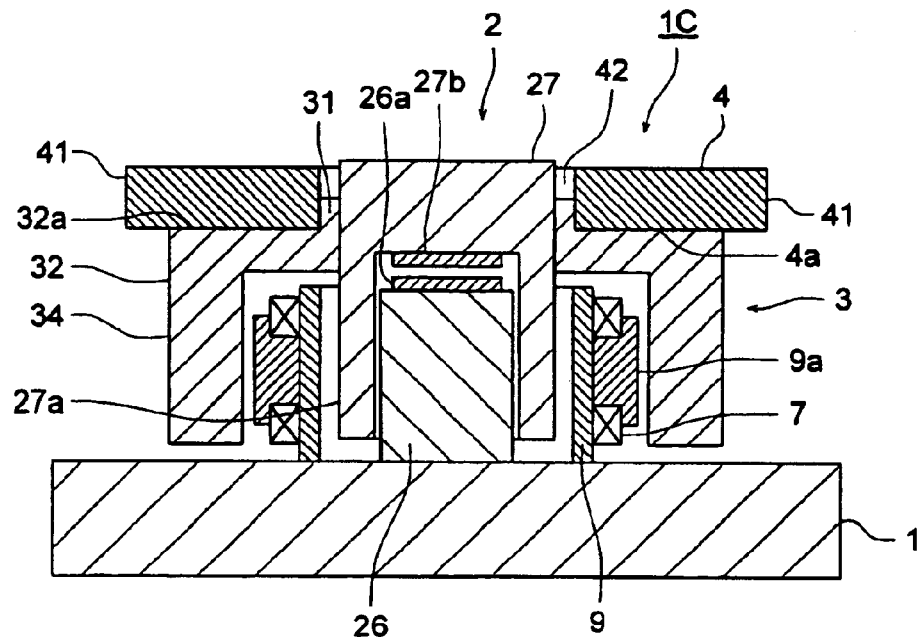
FIG. 3 is a longitudinal cross section showing the third embodiment of an optical deflection device related to the invention.

FIG. 3 is a longitudinal cross section of the third embodiment of the optical deflection device related to the invention. Symbols which are the same as those in FIG. 1 have the same structure, unless otherwise explained.

In optical deflection device 1C, bearing 2 on which the body of rotation 3 is mounted and supported rotatably is composed of cylindrical and fixed bearing 26 provided to be standing on the upper surface of base 1 and rotary bearing 27 that is fitted externally with the fixed bearing 26 rotatably.

The rotary bearing 27 is formed to be a bottomed cylinder, and it is arranged with its cylinder portion 27a fitted with the fixed bearing 26 from its upper portion. An upper surface of the fixed bearing 26 and an inner bottom section of the rotary bearing 27 facing the aforesaid upper surface are respectively provided with magnets 26a and 27b both being repelling each other to lift the rotary bearing 27, and thereby, the rotary bearing 27 is lifted from the upper surface of the fixed bearing 26 with a slight clearance to be rotatable along the outer circumferential surface of the fixed bearing 26.

There are formed dynamic pressure generating grooves (not shown) on an outer circumferential surface of the fixed bearing 26 or on an inner circumferential surface of the cylinder portion 27a of the rotary bearing 27, and this constitutes an air dynamic pressure bearing which makes the rotary bearing 27 to rotate smoothly along an outer circumferential surface of the fixed bearing, thus, it is possible to rotate the body of rotation 3 at higher speed.

Even in this embodiment, when the fixed bearing 26 and the rotary bearing 27 both constituting the air dynamic pressure bearing, are made of ceramic, their abrasion resistance increases to make them to rotate at high speed with a long life, which is preferable.

The body of rotation 3 in the present embodiment is fixed on the rotary bearing 27, and has the cylindrical section 31 that is fitted externally with the rotary bearing 27 and the flange section 32 extending from the cylindrical section 31 in the radial direction, and further has outer cylindrical section 34 that is provided to be protruded from a bottom face on the outer peripheral portion of the flange section 32. On the upper surface of the flange section 32, reference plane 32a of the body of rotation 3 is formed through the work of machining, and thereby, the cylindrical section 31 and the flange section 32 are formed to be stepwise.

The polygon mirror 4 is glued directly on the body of rotation 3, with its central opening 42 being fitted externally with the cylindrical section 31 of the body of rotation 3, and with its one end face 4a being brought into contact with the reference plane 32a on the upper surface of the flange section 32.

On the upper surface of base 1, coils 7 wound around iron core 9a that is arranged radially from cylindrically-formed coil mounting member 9 are provided to be concentric with fixed bearing 26, at the place that is outside the rotary bearing 27 and is inside the outer cylindrical section 34 of the body of rotation 3. Due to this, each coil 7 is arranged to face an inner circumferential surface of the magnet-made outer cylindrical section 34 of the body of rotation 3, so that the body of rotation 3 may be rotated around the fixed bearing 26 which serves as a shaft.

In the optical deflection device 1C of the third embodiment, it is possible to make a diameter of body of rotation 3 to be small and thereby to make a polygon motor whose diameter is small, because the coil 7 is arranged to face an inner circumferential surface of the outer cylindrical section 34 of the body of rotation 3, in addition to the effect equal to the foregoing.

Further, it is possible to lighten the load for starting, because the body of rotation 3 is lifted from the fixed bearing 26 by magnets 26a and 27b even when the body of rotation 3 is suspended.

Figure 4:
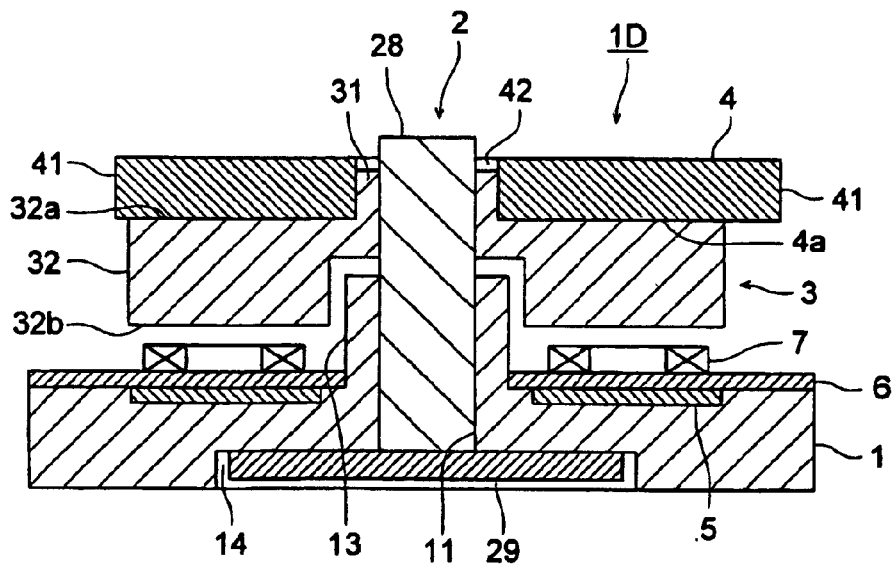
FIG. 4 is a longitudinal cross section showing the fourth embodiment of an optical deflection device related to the invention.

FIG. 4 is a longitudinal cross section showing the fourth embodiment of an optical deflection device related to the invention. Symbols which are the same as those in FIG. 1 have the same structure, unless otherwise explained.

In optical deflection device 1D, bearing 2 is provided in opening 11 bored on base 1. On the upper edge portion of the opening 11, cylindrical section 13 is provided to be protruded from the upper surface of base 1 to extend the opening 11 toward the upper portion of the base 1.

In the opening 11, cylindrical rotary bearing 28 is fitted rotatably, and the cylindrical section 13 constitutes a radial bearing that supports an outer circumferential surface of the rotary bearing 28 accordingly. Further, recessed portion 14 is formed on the bottom surface of the base 1, and plate-shaped and thrust type fixed bearing 29 is provided thereon in a way to cover the bottom end of the opening 11, and the bearing 2 is constituted by these cylindrical section (radial bearing) 13 and thrust bearing 29.

Either on the upper surface of the thrust bearing 29 facing the bottom surface of the rotary bearing 28 or on the bottom surface of the rotary bearing 28, and on the outer circumferential surface of the rotary bearing 28, there are formed dynamic pressure generating grooves (not shown), and due to this, an air dynamic pressure bearing that makes rotary bearing 28 to rotate smoothly in the cylindrical section 13 is constituted, and the body of rotation 3 can be made to rotate at higher speed.

Even in this embodiment, when the cylindrical section (radial bearing) 13, thrust bearing 29 and rotary bearing 28 are made of ceramic, their abrasion resistance increases to make them to rotate at high speed with a long life, which is preferable.

The body of rotation 3 in the present embodiment is fixed on rotary bearing 28, and has cylindrical section 31 that is fitted externally with the rotary bearing 28 and flange section 32 that extends from the cylindrical section 31 in the radial direction. On the upper surface of the flange section 32, reference plane 32a of the body of rotation 3 is formed through the work of machining, and thereby, the cylindrical section 31 and the flange section 32 are formed to be stepwise.

The polygon mirror 4 is glued directly on the body of rotation 3, with its central opening 42 being fitted externally with the cylindrical section 31 of the body of rotation 3, and with its one end face 4a being brought into contact with the reference plane 32a on the upper surface of the flange section 32.

In the optical deflection device 1D of the fourth embodiment, it is possible to reduce the number of parts and to reduce further the man-hour requirement for incorporating, because cylindrical section 13 of base 1 serves also as a radial bearing in addition to the effect equal to the foregoing.

Further, it is possible to prevent a change in diameter of the rotary bearing 28 that is caused when the body of rotation 3 is fixed on the rotary bearing 28 by means of force fitting or shrinkage fitting, because the rotary bearing 28 does not need to be hollow.

In the explanation for each embodiment stated above, the body of rotation 3 made of a magnet is one wherein bearing 2 (each of rotary bearings 22, 24, 27 and 28) and a plastic magnet are fixed solidly through injection molding. However, the fixing method is not limited to this, and the body of rotation 3 can also be fixed on each of the rotary bearings 22, 24, 27 and 28 by means of either one of force fitting, shrinkage fitting and adhesion after the body of rotation 3 is formed individually. In this case, a magnet that forms the body of rotation 3 does not necessarily need to be a plastic magnet.

Figure 5:
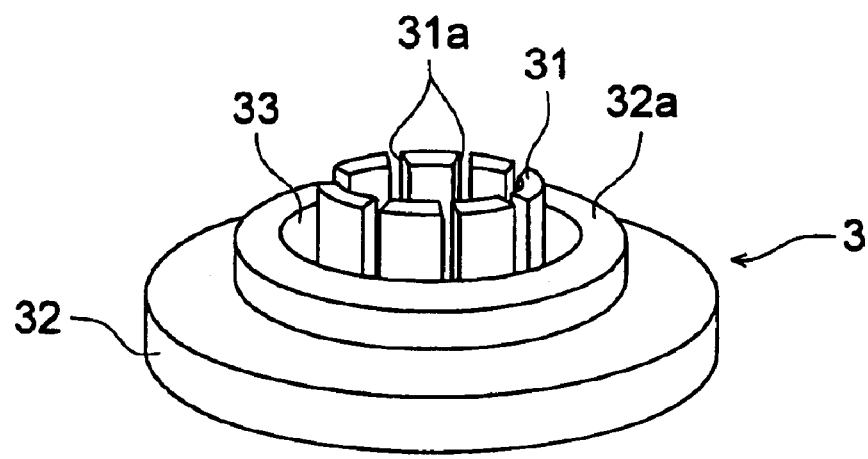
Figure 5:
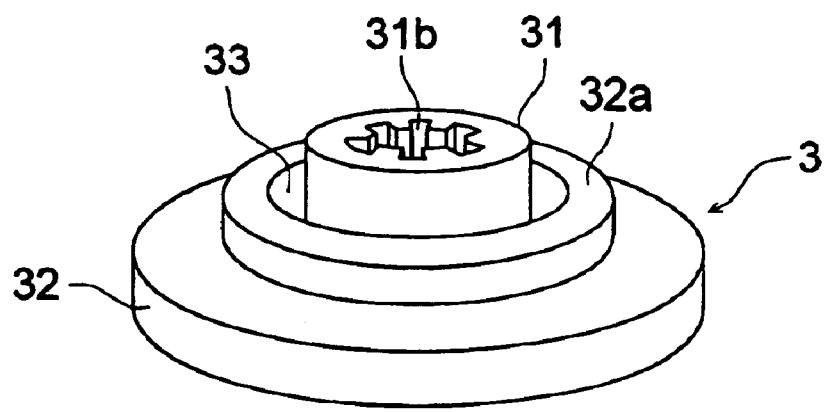

When fixing the body of rotation 3 by means of force fitting, shrinkage fitting or adhesion, it is preferable to provide cut-outs or irregularities on cylindrical section 31 of the body of rotation 3 that comes in contact when the body of rotation 3 is fitted with each of rotary bearings 22, 24, 27 and 28. FIG. 5(A) shows an example wherein numerous cut-outs 31a each extending in the longitudinal direction are provided on the cylindrical section 31 of the body of rotation 3 shown in FIG. 2. On the other hand, FIG. 5(B) shows an example wherein numerous protruded stripes in the longitudinal direction are provided on the inner circumferential surface of the cylindrical section 31 of the body of rotation 3 shown in FIG. 2, and irregularities are provided on the cylindrical section 31.

When cut-outs or irregularities are provided on the cylindrical section 31 of the body of rotation 3, a section of contact between the cylindrical section 31 of the body of rotation 3 and each of rotary bearings 22, 24, 27 and 28 is made to be deformed easily, a break of a magnet in the course of force fitting and coming off caused by temperature changes in use can be prevented, and adhesive agents can enter the inside of cut-outs and irregularities to make the adhesion to be firm. Incidentally, even for the body of rotation 3 shown in each of FIG. 1, FIG. 3 and FIG. 4, a method of fixing by means of force fitting, shrinkage fitting or adhesion can be employed in exactly the same way as in the foregoing.

Incidentally, in the embodiment shown in each of FIGS. 2–4 explained above, there has been shown an example wherein an air dynamic pressure bearing is used as a bearing. However, an oil dynamic pressure bearing and a sintered oil retaining bearing can also be used without being limited to the air dynamic pressure bearing.

The optical deflection devices 1A–1D stated above can be used commonly for an image forming apparatus wherein light emitted from a light source such as a semiconductor laser is deflected to scan an image recording medium for recording and thereby to form an image, such as a laser printer, a laser copying machine, a laser facsimile machine and a combined machine including the foregoing.

Figure 6:
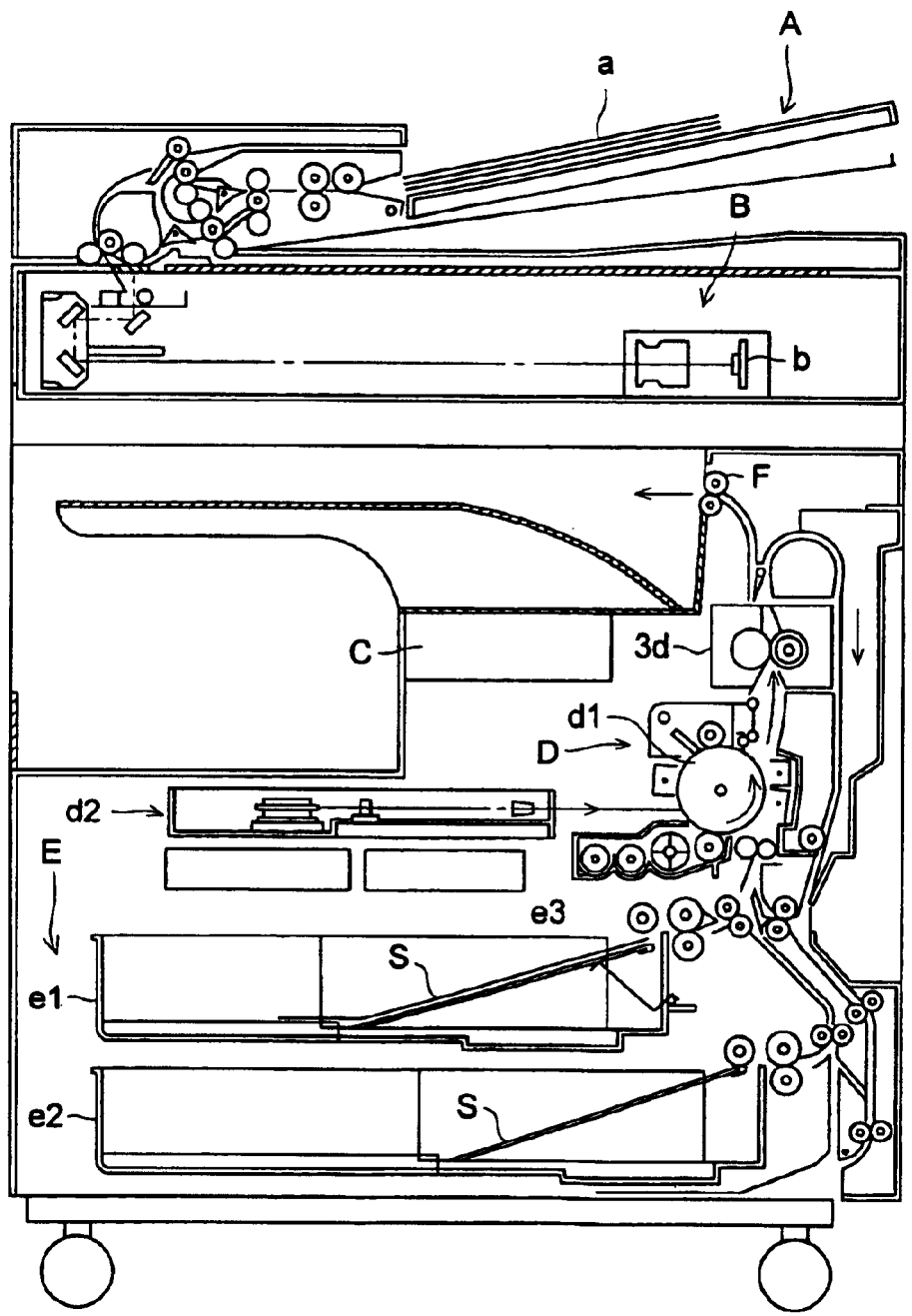
FIG. 6 is a longitudinal cross section showing an example of an image forming apparatus related to the invention.

FIG. 6 is a cross section showing an example wherein an image forming apparatus is a laser copying machine.

On the upper portion of the image forming apparatus main body, there is installed automatic document feeder A, and document a set on the top face of the automatic document feeder is conveyed automatically to a reading position on image reading section B, one sheet by one sheet.

The image reading section B reads a document conveyed to the reading position as an optical image by CCD line sensor b, and converts it photoelectrically into an electric signal (image signal) to obtain image data from the document. Image data obtained from the document through reading are subjected to various image processing such as density conversion, filter processing, magnification-changing processing and γ correction in image processing section C, and then, are outputted to image recording section D.

The image recording section D has therein photoreceptor d1 representing an image recording medium, laser optical system d2 that scans the photoreceptor d1 with a laser beam coming from a semiconductor laser modulated based on image signals obtained through reading by CCD line sensor b of the image reading section B, and fixing unit d3 that transfers toner images formed on the photoreceptor d1 by a laser beam deflected by the laser optical system d2 onto recording sheet s and fixes them.

The recording sheet s is loaded on each of cassette e1 and cassette e2 each being set in sheet feeding conveyance section E for each size, and is conveyed by conveyance means e3 to photoreceptor d1 of image recording section D one sheet by one sheet. On the recording surface of the recording sheet s which has been conveyed, a toner image is transferred, and the transferred image is fixed by the fixing unit d3, thus, an image is formed. The recording sheet on which an image has been formed is ejected out of sheet ejection section F.

Figure 7:
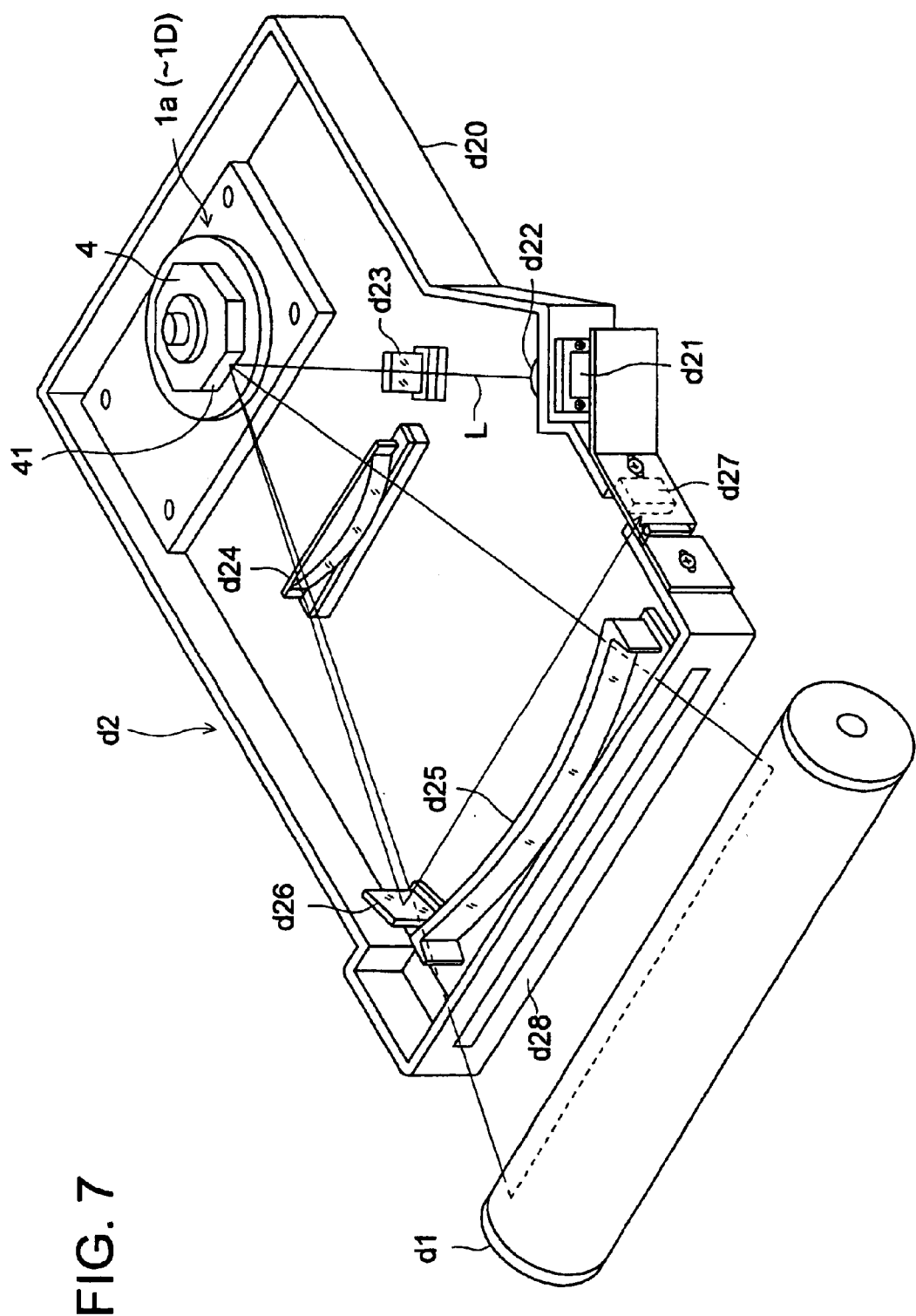
FIG. 7 is a perspective view showing an example of a laser optical system.
Figure 8:
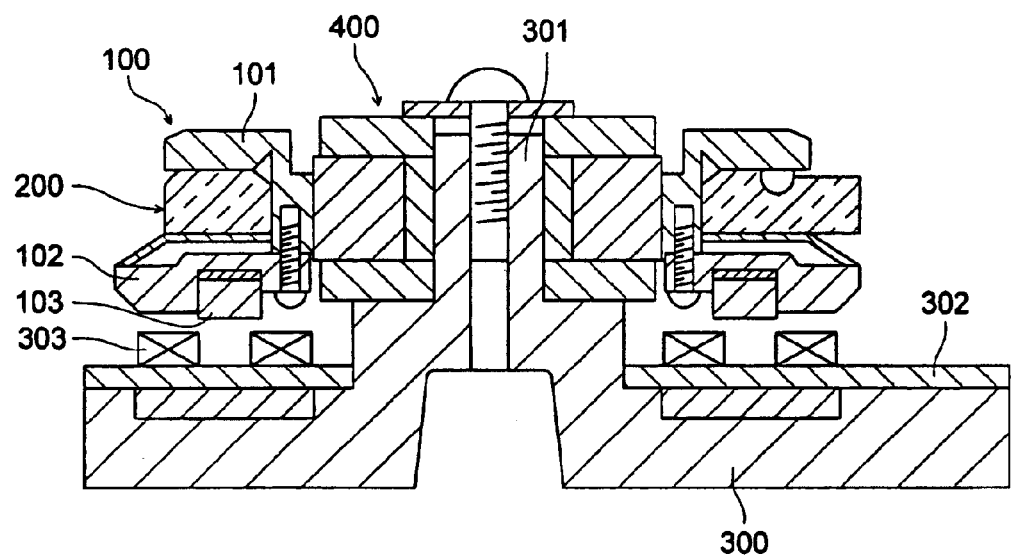
FIG. 8 is a longitudinal cross section showing a conventional optical deflection device.

FIG. 7 is a perspective view showing a schematic structure of the laser optical system d2. In the drawing, d21 represents a light source composed of a semiconductor laser, d22 represents a collimator lens, d23 represents a first cylindrical lens, d24 represents fθ lens, d25 represents a second cylindrical lens, d26 represents an index mirror and d27 represents an index sensor.

Light beam L emitted from light source d21 that is driven in accordance with image data is collimated by collimator lens d22, and then, passes through the first cylindrical lens d23 and enters mirror surface 41 of polygon mirror 4 of the optical deflection device. As this optical deflection device, the optical deflection devices 1A–1D stated above are used. The polygon mirror 4 keeps rotating at a speed of the prescribed rpm, and deflects entering light beam L. The deflected light beam L passes through fθ lens d24 and second cylindrical lens d25, then, passes through slot d28 made on housing d20 to scan the surface of photoreceptor d1 with a spot in a prescribe diameter size in the sub-scanning direction, thus, a latent image is recorded and formed on the surface of the photoreceptor d1.

Optical beam L which is generated when optical beam L is reflected by index mirror d26 each time the optical beam L is deflected in the sub-scanning direction is detected by index sensor d27. On the index sensor d27, incidence timing is detected to obtain the timing to start writing of image forming for each line.

The latent image recorded and formed on the surface of photoreceptor d1 as in the foregoing is transferred onto the recording surface of recording sheet s, then, is fixed by fixing unit d3 to be formed as an image which is ejected out.

In the image forming apparatus of the invention wherein the optical deflection devices 1A–1D stated above are used as an optical deflection device, it is possible to make laser optical unit d2 to be inexpensive, and to reduce cost of the image forming apparatus.

The invention makes it possible to provide an optical deflection device wherein the number of parts for incorporating a polygon mirror is reduced sharply to achieve low cost and a small size of the optical deflection device, and an image forming apparatus employing the optical deflection device.

What is claimed is:

1. An optical deflection device comprising:
   (a) a rotary body formed of a magnet, to which a polygon mirror is fixed;
   (b) a bearing to which the rotary body is fixed; and
   (c) a base table having a coil facing the magnet, the coil capable of rotating the rotary body formed of the magnet, wherein the rotary body is made of plastic magnet which is integrally fixed on the bearing by an injection molding process.

2. The optical deflection device of claim 1, wherein the bearing is a dynamic pressure bearing.

3. The optical deflection device of claim 1, wherein the bearing is made of ceramic.

4. The optical deflection device of claim 1, wherein the rotary body has a cylindrical section that is fitted externally with the bearing and a groove provided around the cylindrical section to be concentric with the cylindrical section.

5. An optical deflection device comprising:
(a) a rotary body formed of a magnet, to which a polygon mirror is fixed;
(b) a bearing to which the rotary body is fixed; and
(c) a base table having a coil facing the magnet, the coil capable of rotaring the rotary body formed of the magnet, wherein the rotary body is fixed on the bearing by either one of force-fitting, shrinkage fitting and adhesion, and
wherein the rotary body is provided with a slit or a recessed stripe extending in an axis direction of the bearing on a cylindrical section of the rotary body that comes in contact with the bearing.

* * * * *